US012722768B1

(12) United States Patent
Jarvis et al.

(10) Patent No.: US 12,722,768 B1
(45) Date of Patent: Sep. 1, 2026

(54) NOSE-TIP ASSEMBLY FOR HYPERSONIC AND HIGH-SPEED VEHICLES

(71) Applicant: The Boeing Company, Arlington, VA (US)

(72) Inventors: Cynthia Jarvis, Manchester, MO (US); Rhyan G. Hardman, Madison, AL (US); Jeremy N. O'Hara, St. Louis, MO (US); Derek J. Fox, O'Fallon, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/365,573

(22) Filed: Oct. 22, 2025

(51) Int. Cl.
*B64C 1/06* (2006.01)
*B64C 1/38* (2006.01)
*B64C 30/00* (2006.01)

(52) U.S. Cl.
CPC .............. *B64C 1/0683* (2020.01); *B64C 1/38* (2013.01); *B64C 30/00* (2013.01)

(58) Field of Classification Search
CPC .......... B64C 1/0683; B64C 1/38; B64C 30/00
See application file for complete search history.

(56) References Cited

U.S. PATENT DOCUMENTS 9,004,393 B2 4/2015 Barrett-Gonzales
9,132,908 B1 * 9/2015 Grip ...................... B64C 1/0683
10,119,797 B2 * 11/2018 Burczynski ............. F42B 12/78
10,352,669 B2 * 7/2019 Fournier ................. F42B 30/02
11,260,953 B2 3/2022 Rathay et al.
11,260,976 B2 3/2022 Gerstler et al.
11,535,355 B2 12/2022 Lakebrink et al.
2006/0124022 A1 * 6/2006 Eberhart ................. F42B 12/34 102/508
2016/0252335 A1 9/2016 Cary et al.
2018/0245896 A1 * 8/2018 Burczynski ............. F42B 12/34

FOREIGN PATENT DOCUMENTS

CN 113955070 A * 1/2022 ............. B64U 10/25
KR 101569374 B1 * 11/2015 ............... B64C 1/38

* cited by examiner

*Primary Examiner* — Valentina Xavier
(74) *Attorney, Agent, or Firm* — Walters & Wasylyna LLC

(57) ABSTRACT

A nose-tip assembly for a vehicle is provided. The assembly includes a nose tip having a forward aerodynamic portion and a rearward shaft portion. The rearward shaft portion includes an exterior conical surface and an enlarged end region. An insert is formed from multiple pieces that are securable together to define an internal bore receiving the rearward shaft portion of the nose tip. The internal bore includes a throat sized smaller than the enlarged end region so that the enlarged end region is retained within the insert. An adapter defines a cavity having an interior conical surface that engages the exterior conical surface of the nose tip, and a receptacle that receives the insert.

20 Claims, 5 Drawing Sheets

128
124
126
120
122
110
100

500

240
224
230
220
222

210
200
210

NOSE-TIP ASSEMBLY FOR HYPERSONIC AND HIGH-SPEED VEHICLES

GOVERNMENT RIGHTS

This invention was made with Government support under Contract No. FA8219-24-3-0001 awarded by the Department of Defense (DoD). The Government has certain rights in the invention.

FIELD

The present application relates generally to vehicle structures, and more particularly to assemblies for attaching a nose tip to a vehicle body in applications such as hypersonic vehicles, rockets, and spacecraft.

BACKGROUND

Vehicles that operate at high speeds or in high-temperature environments encounter extreme aerodynamic and thermal conditions. The nose tip of such vehicles is exposed to particularly high temperatures, pressure gradients, and axial loads due to its position at the leading edge. During sustained operation, the nose tip may experience prolonged heating, high thermal flux, and severe mechanical stresses. Reliable retention of the nose tip under these conditions is therefore an important design consideration for vehicles such as hypersonic vehicles, rockets, missiles, and spacecraft.

A number of attachment approaches have been developed for securing nose tips to vehicle structures. Adhesive bonding is commonly used to join composite nose tips to metallic or ceramic substructures, and mechanical fastening systems such as bolts or threaded joints are also employed in some designs. Each approach offers particular benefits but also presents engineering considerations when applied to demanding environments. For example, adhesive bonds may involve detailed processing steps and temperature-dependent performance characteristics. Mechanical fasteners may require attention to stress distribution, material selection, and integration with thermal protection systems.

As high-speed vehicle concepts continue to advance, there remains interest in attachment systems that can provide robust retention of composite nose tips while accommodating elevated thermal and aerodynamic loads. Desirable features include the ability to maintain structural integrity, tolerate dimensional variations, distribute stresses effectively, and adapt across different vehicle designs and operating regimes.

SUMMARY

In one embodiment, a nose-tip assembly for a vehicle is provided. In an example, the assembly includes a nose tip having a forward aerodynamic portion and a rearward shaft portion. The rearward shaft portion includes an exterior conical surface and an enlarged end region. An insert formed of multiple pieces is securable together to define an internal bore that receives the rearward shaft portion of the nose tip, the bore including a throat smaller than the enlarged end region such that the enlarged end region is retained within the insert. An adapter defines a cavity having an interior conical surface that engages the exterior conical surface of the nose tip, and a receptacle that receives the insert.

In another embodiment, a vehicle is provided that includes the nose-tip assembly. In an example, the vehicle may be a hypersonic vehicle, a rocket, or a spacecraft, and the nose-tip assembly is configured to provide secure retention and alignment of the nose tip during operation.

In yet another embodiment, a method of assembling a nose-tip assembly is provided. In an example, the method includes placing an insert comprising multiple pieces around a shaft portion of a nose tip and securing the insert pieces together to clamp the shaft portion within a bore of the insert. The method further includes positioning the nose tip and insert into a cavity of an adapter, and fastening the adapter to apply a preload urging an exterior conical surface of the nose tip against an interior conical surface of the adapter.

Other embodiments of the disclosed nose-tip assemblies, vehicles, and methods will become apparent from the following detailed description, the accompanying drawings, and the appended claims.

DETAILED DESCRIPTION

The present disclosure provides a nose-tip assembly configured for secure retention in extreme thermal and aerodynamic environments, such as those encountered by hypersonic vehicles. The assembly generally includes a nose tip, an insert, an adapter, and a body interface, which together form a mechanically retained configuration that avoids the drawbacks of bonded and bolted joints.

The drawings illustrate exemplary embodiments of the disclosed assembly. The drawings are not intended to be limiting but instead provide representative configurations to facilitate understanding of the structural relationships and functionality.

Figure 1:
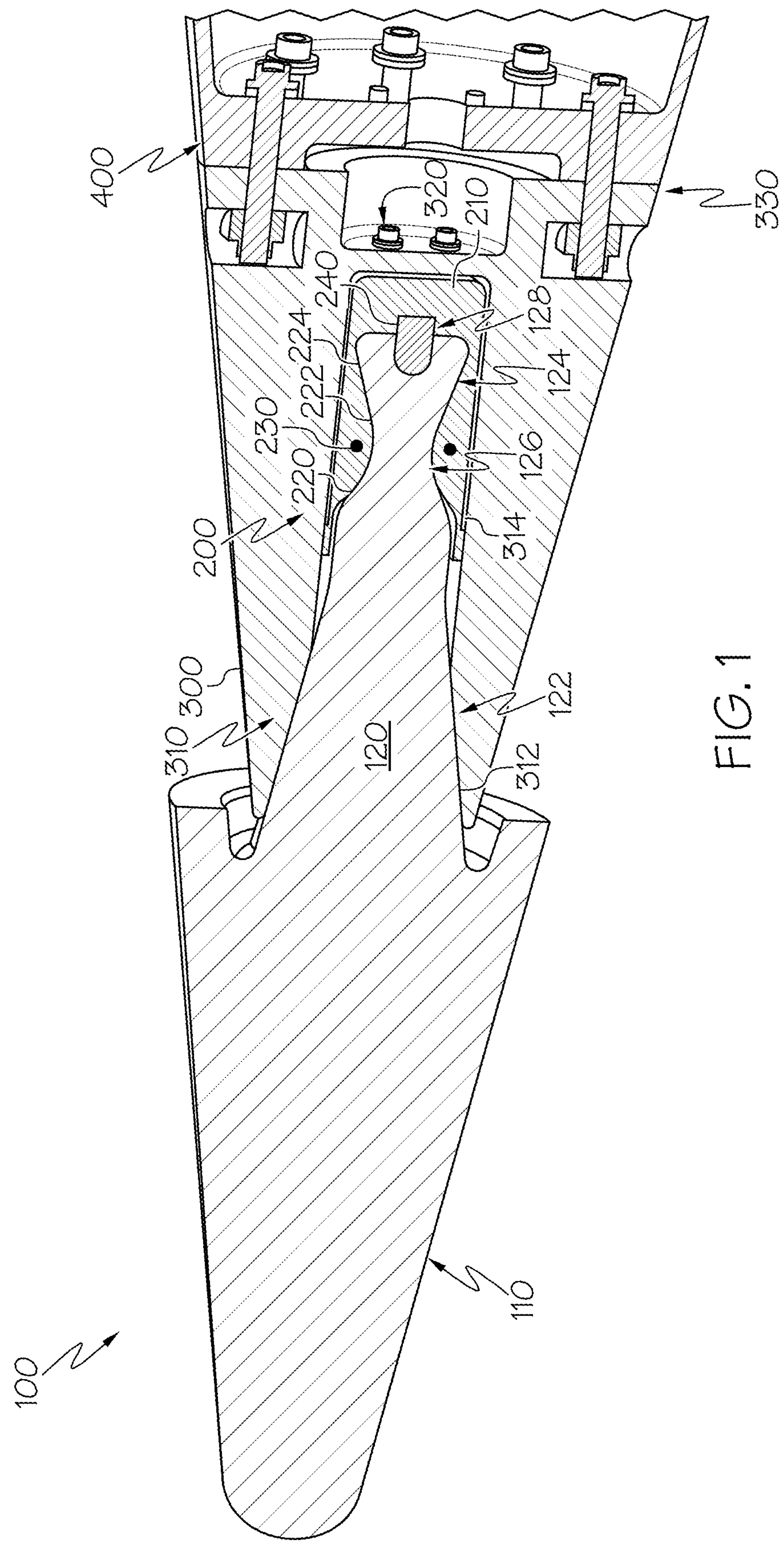
FIG. 1 is a cross-sectional view of a nose-tip assembly according to an embodiment.

FIG. 1 illustrates, in cross-section, a nose-tip assembly (100, 200, 300, 400) according to one embodiment. The figure shows the nose tip 100 received within an insert 200, which is in turn positioned within an adapter 300 attached to a vehicle body 400. Structural features such as the enlarged end region of the nose tip, the throat of the insert, and the conical engagement between the nose tip and adapter are depicted in their assembled relationship.

Figure 2:
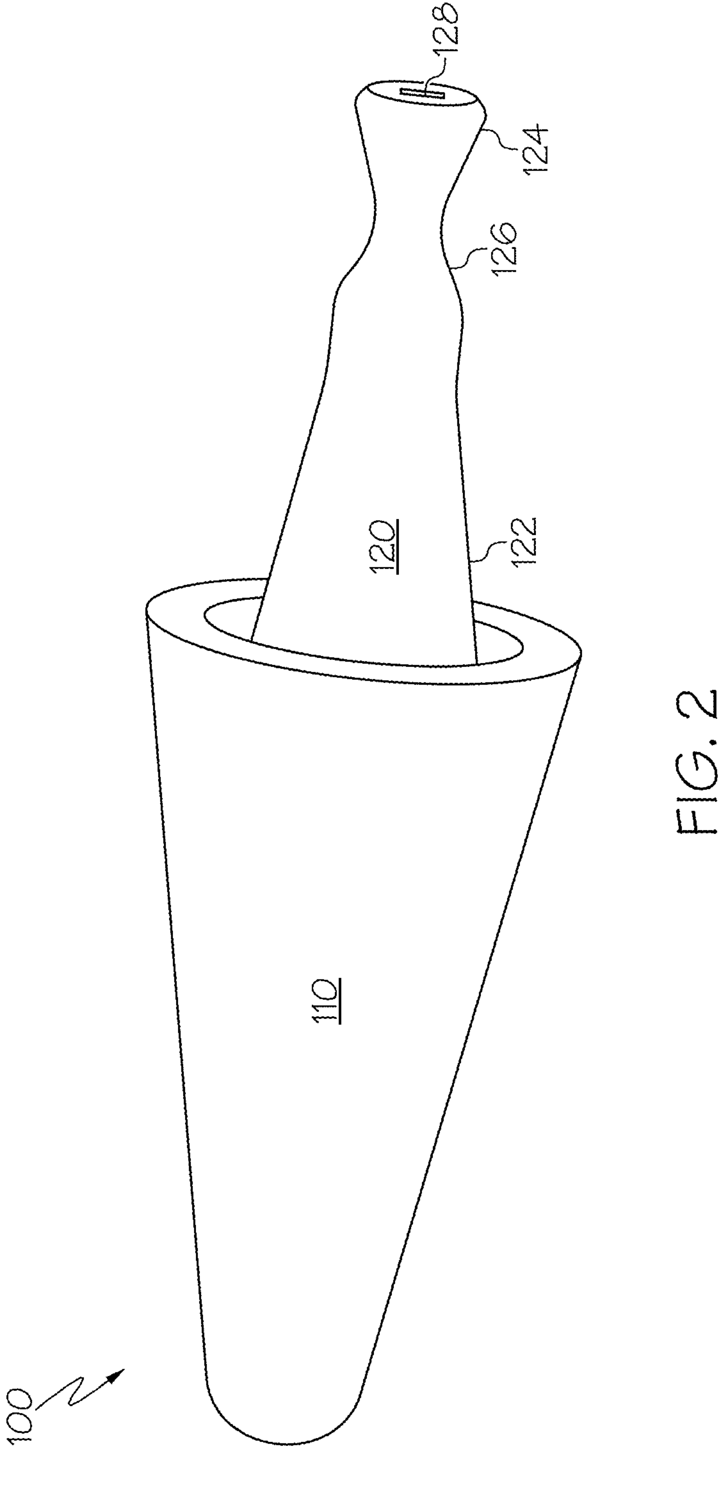
FIG. 2 is a perspective view of a nose tip of the nose-tip assembly of FIG. 1.

FIG. 2 depicts the nose tip 100 separately from the remainder of the assembly. The nose tip includes a forward aerodynamic portion 110 that defines the aerodynamic profile of the vehicle, and a rearward shaft portion 120 that provides structural engagement with the insert and adapter. Features such as the exterior conical surface 122, curved transition region 126, enlarged end region 124, and optional groove 128 are illustrated.

Figures 3, 5:
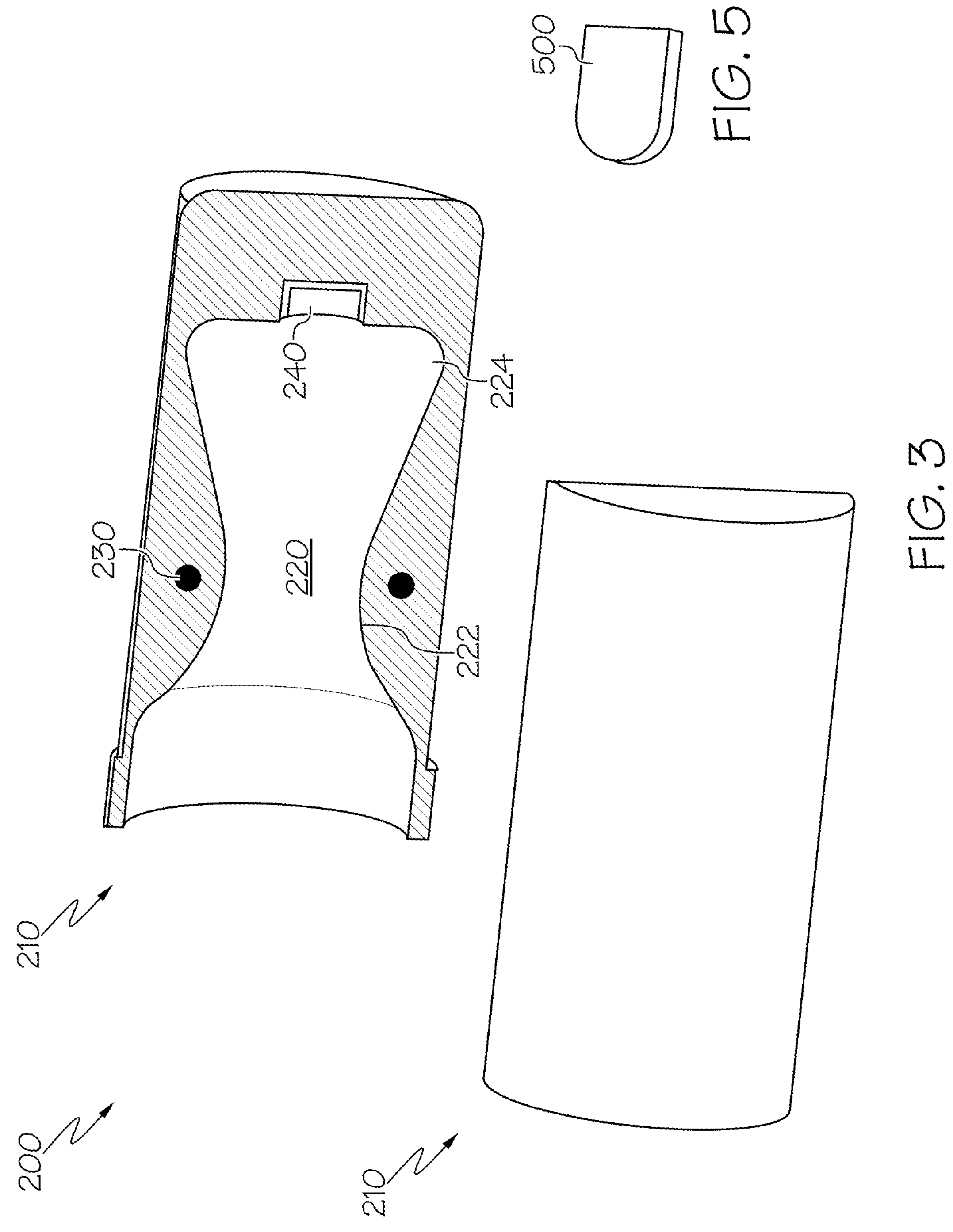
FIG. 3 is a view of an insert of the nose-tip assembly of FIG. 1.
FIG. 5 is a view of a key configured to engage a groove of the nose tip and the inserts to provide an anti-rotation feature.

FIG. 3 shows the insert 200 in isolation. In the illustrated embodiment, the insert is divided into two halves 210 that, when joined, define an internal bore 220 sized to receive the shaft portion of the nose tip. A throat 222 retains the enlarged end region of the nose tip, while a capture region 224 accommodates that region during assembly. The insert halves include fastener holes 230 to receive fasteners that clamp the halves together, and an anti-rotation feature 240 configured to resist relative rotation between the insert and the nose tip.

Figure 4A:
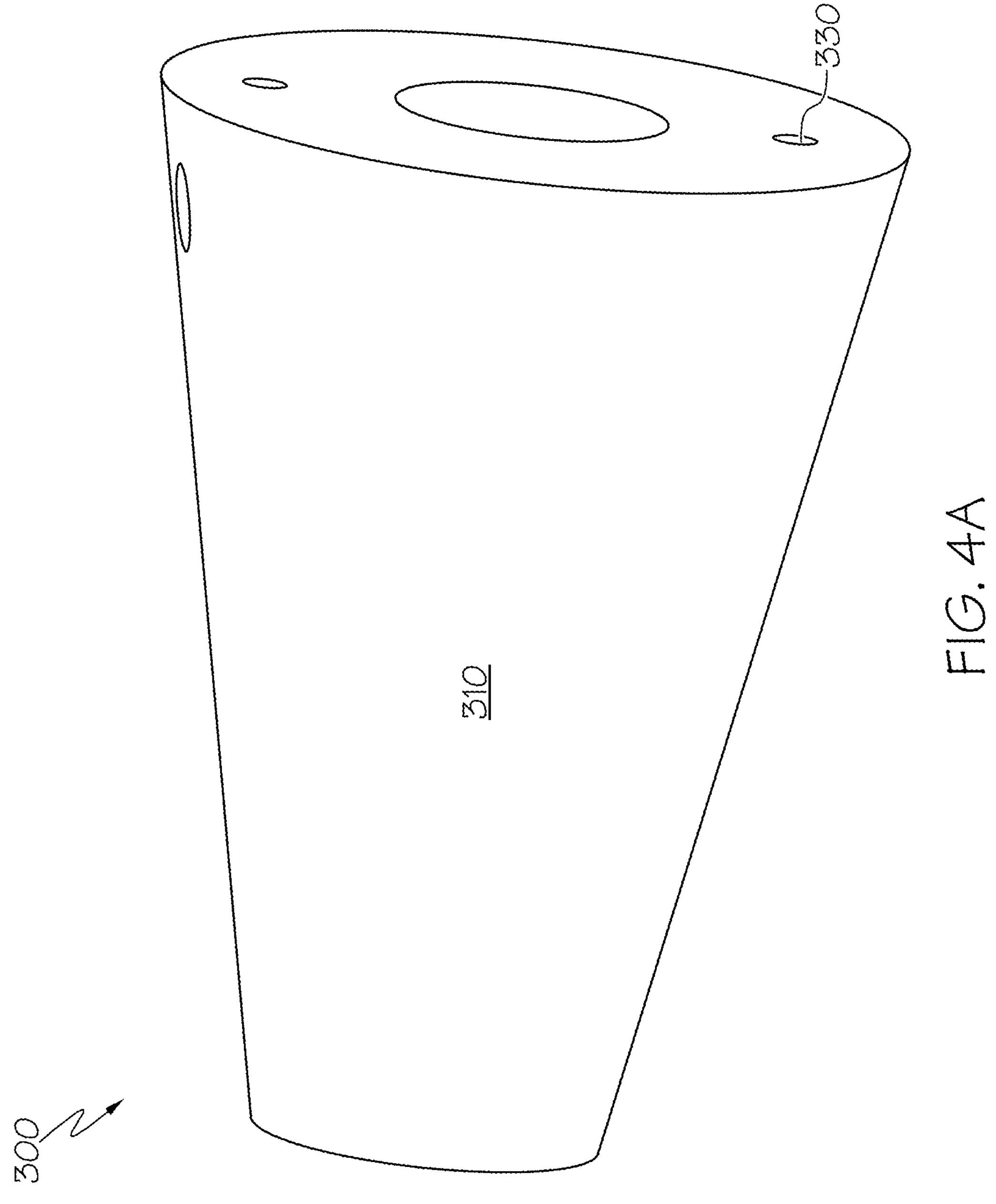
FIGS. 4A and 4B are views of an adapter of the nose-tip assembly of FIG. 1.
Figure 4B:
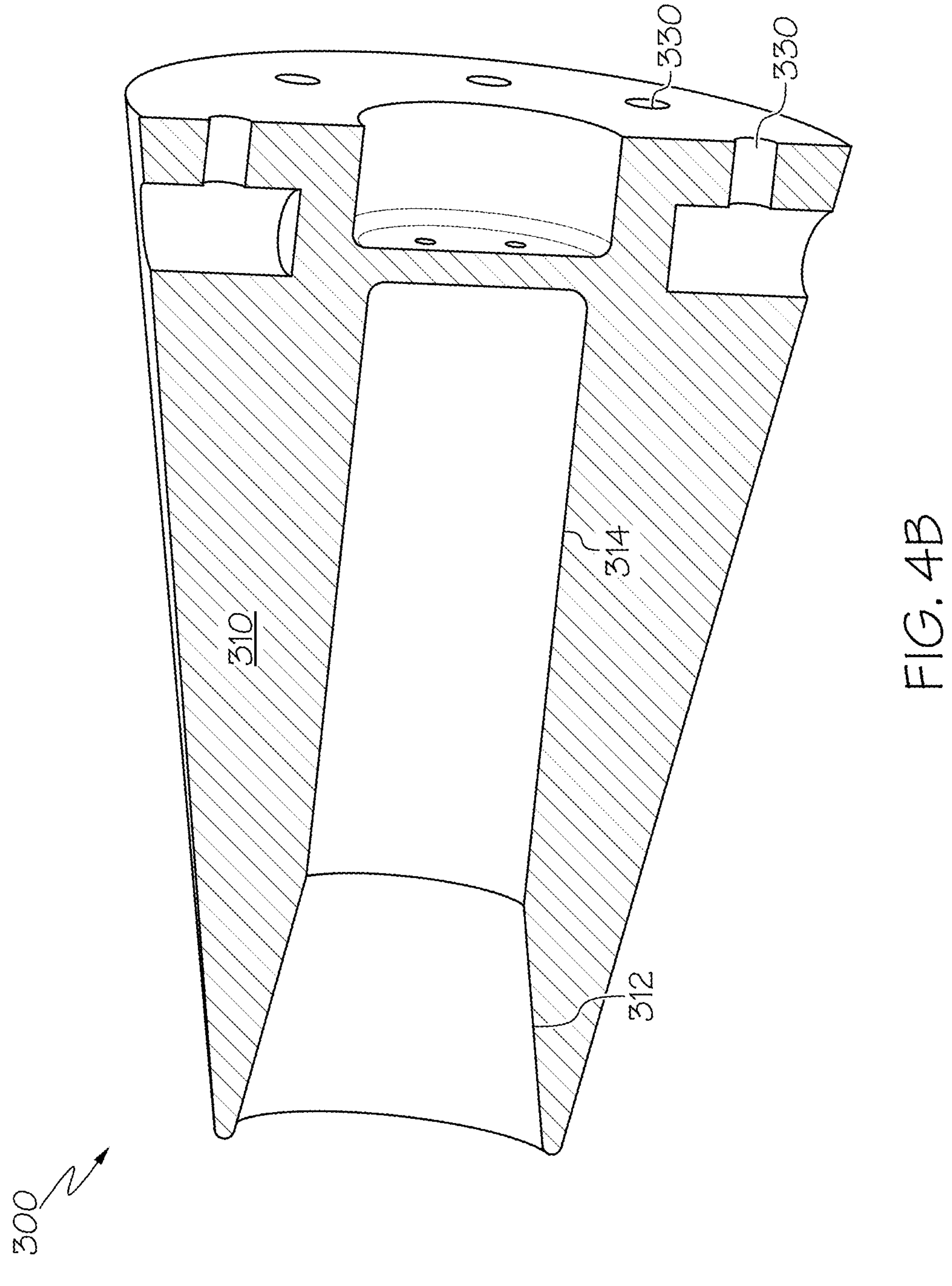

FIGS. 4A and 4B illustrate the adapter 300. The adapter defines a cavity 310 having an interior conical surface 312 and a receptacle 314. The adapter further includes a body interface 330 by which the adapter may be fastened to a vehicle body. The figures show both an exterior view (FIG. 4A) and a cross-sectional view (FIG. 4B) to highlight the internal cavity and load-bearing surfaces.

FIG. 5 illustrates a key 500, which may be received within a complementary groove 128 of the nose tip 100 to provide an anti-rotation feature. This engagement resists torsional slip between the insert and the nose tip during operation.

The components of the nose-tip assembly will now be described in greater detail. While FIG. 1 depicts the assembly in its integrated form, the individual figures illustrate the nose tip, insert, and adapter separately to better show their respective features and interactions. For clarity, each component is described below in isolation, followed by a discussion of the overall assembly, operation, and variations. It should be understood that the particular geometries shown in the figures are illustrative, and that dimensions, contours, and proportions may vary depending on the vehicle design, material selection, and operating requirements.

Nose Tip

The nose tip defines the forwardmost portion of the assembly and is generally configured to withstand the aerodynamic and thermal loads encountered during high-speed or hypersonic flight. The nose tip includes a forward aerodynamic portion 110 and a rearward shaft portion 120.

The forward aerodynamic portion 110 establishes the outer aerodynamic profile of the vehicle. Depending on mission requirements, the forward portion may assume a variety of shapes, including conical, ogival, parabolic, blunted, or other suitable configurations. The specific geometry may be selected based on desired aerodynamic performance, thermal distribution, or manufacturability, and the invention is not limited to any particular aerodynamic profile.

The rearward shaft portion 120 extends aft from the forward aerodynamic portion 110 and provides the structural interface with the insert 200 and the adapter 300. The shaft portion includes an exterior conical surface 122 that engages the interior conical surface 312 of the adapter to form a primary load-bearing interface. The shaft portion further includes an enlarged end region 124 that is greater in diameter than the throat 222 of the insert, thereby preventing the nose tip from being pulled forward through the insert during operation. A curved transition region 126 may extend between the exterior conical surface 122 and the enlarged end region 124 to distribute stresses and reduce the likelihood of stress concentrations at geometric discontinuities.

In one aspect, the shaft portion may be generally hourglass-shaped, wherein the geometry narrows in the region of the throat 222 and enlarges at the end region 124. The hourglass shape may be substantially symmetrical about the throat, or may be non-symmetrical with varied contours, and may include curved surfaces to assist in distributing stresses under load. Alternative shapes may also be employed, provided that they enable retention of the nose tip within the insert while accommodating load transfer through the adapter.

In some embodiments, the shaft portion 120 may further include a groove 128 or other recess configured to receive a key 500 or other anti-rotation feature of the insert. Engagement of the groove and key resists torsional slip between the nose tip and the insert that may occur during aerodynamic loading, vehicle maneuvers, or vibration.

The nose tip 100 may be formed from high-temperature composite materials capable of maintaining structural integrity under the extreme environment of hypersonic flight. Examples include three-dimensionally reinforced carbon-carbon composites, ceramic matrix composites, refractory composites, or combinations thereof. Other materials may also be used, such as ultra-high temperature ceramics, advanced ablative composites, or fiber-reinforced refractory materials, depending on the vehicle design and operating conditions.

An advantage of this configuration is that the nose tip does not require any penetrations such as holes, threads, or other discontinuities that could weaken the composite material. By employing geometric retention through the enlarged end region and load transfer through the conical surfaces, the structural integrity of the composite nose tip can be maintained while ensuring reliable retention during operation.

Insert

The insert 200 provides a mechanical interface between the nose tip 100 and the adapter 300, enabling the nose tip to be retained without adhesives or penetrations into the composite structure. In the illustrated embodiment, the insert is formed from two halves 210 that, when joined together, define an internal bore 220 sized to receive the shaft portion 120 of the nose tip. In other embodiments, the insert may include more than two pieces, or may be divided along alternative split planes, such as diagonal or stepped planes, to facilitate assembly or to accommodate different shaft geometries.

The internal bore 220 of the insert includes a throat 222 having a diameter smaller than the enlarged end region 124 of the nose tip. When the insert halves 210 are secured around the shaft portion 120, the enlarged end region 124 is retained within a capture region 224 of the bore. This configuration prevents the nose tip from being pulled forward through the insert during operation, while allowing the shaft portion 120 to be clamped securely. In some embodiments, the bore 220 defines continuous load-bearing surfaces that engage the shaft portion 120 along at least part of its length. Such surfaces may provide distributed contact with the shaft portion to stabilize the nose tip and improve load transfer between the nose tip and the insert.

In the embodiment shown, the insert halves 210 include fastener holes 230 that receive fasteners for clamping the halves together. Other fastening techniques may also be used. For example, the insert halves may be joined by clamps, bands, dovetail joints, pins, interlocking features, adhesives, welding, brazing, or combinations thereof, depending on the materials and application requirements. The choice of fastening method may vary with desired ease of assembly, thermal environment, or manufacturing considerations. Regardless of the fastening approach, the purpose is to secure the insert pieces together so that the enlarged end region 124 of the nose tip remains captured within the bore 220.

The insert 200 may incorporate an anti-rotation feature 240 to resist relative torsion between the insert and the nose tip. In the embodiment shown, the anti-rotation feature includes a key 500 received in a groove 128 of the nose tip and a groove 240 of the insert. This engagement may reduce torsional slip caused by aerodynamic loads, vehicle maneuvers, or vibration. Alternative anti-rotation features may also be used, including splines, keys, tongues, flats, pins, or textured or frictional surfaces. Any of these approaches may be employed individually or in combination to maintain alignment between the nose tip and the insert.

The insert 200 may be formed from high-temperature metallic materials capable of withstanding the thermal and mechanical environment of hypersonic flight. Examples include tungsten, Inconel, steel, refractory alloys, or combinations thereof. In some cases, ceramic or cermet materials may also be used, provided they maintain sufficient structural strength at elevated temperatures.

Through this configuration, the insert 200 clamps around the shaft portion 120 of the nose tip, retains the enlarged end region 124 against pull-out, and stabilizes the nose tip against torsional movement. The insert therefore provides both axial and rotational retention, while also allowing the nose tip to be assembled and disassembled without drilling holes or introducing adhesive bonds into the composite material of the tip.

Adapter

The adapter 300 provides the structural interface between the nose tip 100 and the vehicle body 400. The adapter defines a cavity 310 having an interior conical surface 312 positioned to engage the exterior conical surface 122 of the nose tip. This conical engagement forms a primary load-bearing interface that transfers axial and lateral aerodynamic and inertial loads, along with bending moment, from the nose tip into the adapter during vehicle operation.

The cavity 310 also includes a receptacle 314 sized to receive the insert 200. When the nose tip 100 and insert 200 are assembled together, the subassembly is positioned within the cavity such that the insert is restrained by the receptacle and the conical surfaces 122, 312 are aligned for engagement. This arrangement allows axial preload to be applied to the insert and nose tip by fastening the insert to the adapter.

The adapter 300 may further include a body interface 330 configured to connect the adapter to the vehicle structure. The body interface may take various forms, such as a bolt circle, clamp band, flange connection, threaded connection, or other fastening arrangement suitable for securing the adapter to the forward shell or frame of the vehicle. The selection of interface may depend on the vehicle architecture and integration requirements.

In one embodiment, a plurality of fasteners 320 extend through the adapter to apply axial preload. By tightening the fasteners, the insert 200 and nose tip 100 are drawn rearward such that the exterior conical surface 122 of the nose tip is urged firmly against the interior conical surface 312 of the adapter. The preload maintains continuous contact between the conical surfaces during operation, thereby ensuring stable load transfer and reducing the risk of separation under extreme aerodynamic or thermal conditions. In some embodiments, preload may also be applied directly to the insert 200 prior to securing the adapter, providing additional stability.

The adapter 300 may be formed from materials capable of withstanding the high thermal and structural loads experienced during hypersonic flight. Examples include refractory metals such as tungsten, Inconel, or high-strength steels. In some embodiments, ceramic or composite materials may also be employed, or metallic materials may be combined with ceramic liners or coatings to reduce wear or manage thermal expansion.

The geometry of the adapter 300 may vary depending on the particular application. For example, the receptacle 314 may be cylindrical, stepped, or conical, and the interior conical surface 312 may have different taper angles to accommodate different nose tip geometries. Likewise, the body interface 330 may be adapted for different vehicle structures or fastening systems. These variations allow the adapter to be tailored to different vehicle designs while maintaining the advantageous conical load transfer between the nose tip and the adapter.

Through this configuration, the adapter 300 functions as the structural bridge between the composite nose tip 100 and the vehicle body 400. By combining conical load transfer with mechanical retention provided by the insert 200, the adapter ensures secure and reliable attachment of the nose tip under extreme aerodynamic and thermal environments, without the need for adhesives or fasteners penetrating the composite nose tip.

Vehicle

The vehicle includes a body 400 that provides the structural foundation to which the adapter 300 is attached. In the embodiment shown in FIG. 1, the adapter 300 is secured to a forward portion of the vehicle body 400, such as a fuselage or structural frame member, by way of the body interface 330. The specific form of attachment may vary depending on the vehicle architecture, and may include bolts, clamp bands, threaded connections, flanges, or other fastening structures.

The nose-tip assembly described herein may be employed in a variety of vehicle types. In some embodiments, the vehicle may be a hypersonic vehicle designed for sustained flight at Mach 5 and above, where the nose tip is exposed to extreme aerodynamic heating and mechanical loads. In other embodiments, the vehicle may be a rocket or missile, where the assembly provides reliable retention of the nose tip during launch and atmospheric ascent. In still other embodiments, the vehicle may be a spacecraft or re-entry body, where the nose tip must withstand thermal and structural loads during launch, orbital maneuvering, or atmospheric re-entry. The invention is not limited to any particular vehicle type and may be applied to other high-speed or high-temperature aerospace applications.

In certain cases, the assembly may be implemented in prototype or demonstrator vehicles, such as hypersonic flight test programs, where its design facilitates evaluation and replacement of nose tips between test flights. In other cases, the assembly may be adapted for production vehicles, where repeatable manufacture, tolerance accommodation, and serviceability provide long-term cost and performance advantages. The design may also be configured to integrate with thermal protection systems (TPS), such as by accommodating TPS tiles or coatings applied to the adapter or surrounding body structure.

By providing a robust interface between the nose tip 100 and the vehicle body 400, the adapter 300 ensures that aerodynamic and inertial loads are transferred into the vehicle structure without compromising the integrity of the composite nose tip. This configuration allows the nose-tip assembly to be adapted for use across multiple classes of aerospace vehicles while retaining the advantages of mechanical retention, tolerance accommodation, and maintainability described above.

Method of Manufacture

In some embodiments, a method of manufacturing a nose-tip assembly includes fabricating a nose tip 100, an insert 200, and an adapter 300 as separate components. The nose tip 100 may be formed from high-temperature composite materials, such as carbon-carbon composites, ceramic matrix composites, ultra-high temperature ceramics, or other refractory composites. The forward aerodynamic portion 110 of the nose tip may be shaped to provide a desired aerodynamic profile, and the rearward shaft portion 120 may be contoured to include the exterior conical surface 122, the enlarged end region 124, and, in some embodiments, a groove 128 for receiving an anti-rotation feature.

The insert 200 may be manufactured in two or more pieces. Each piece may be machined, cast, forged, or additively manufactured from refractory alloys such as tungsten, Inconel, or high-strength steels, or from other materials capable of withstanding the hypersonic environment. The internal bore 220 of the insert pieces may be machined or otherwise formed to include the throat 222, capture region 224, and continuous load-bearing surfaces for engaging the shaft portion 120 of the nose tip. Provisions for fastening, such as fastener holes 230 or interlocking features, may also be formed during manufacture.

The adapter 300 may likewise be machined, cast, forged, or additively manufactured from high-temperature metallic alloys. The cavity 310 of the adapter may be shaped to provide the interior conical surface 312 for engagement with the nose tip, and the receptacle 314 for receiving the insert. The body interface 330 may be formed to suit the particular vehicle body 400, such as a bolt circle, clamp band, or flange connection.

Manufacturing processes may also include surface treatments or coatings, such as oxidation-resistant layers, thermal barrier coatings, or wear-resistant liners, applied to selected surfaces of the insert 200 or adapter 300. Such treatments may be used to enhance durability or manage thermal expansion differences between the components.

The components may be manufactured separately and later assembled, or they may be fabricated in coordination so that tolerances between the conical surfaces 122, 312 and the insert bore 220 are matched for the desired preload engagement. This flexibility allows the manufacturing process to be adapted for prototype fabrication, limited production, or scaled production for multiple vehicle platforms.

Assembly and Operation

Assembly of the nose-tip assembly begins with positioning the insert 200 around the rearward shaft portion 120 of the nose tip 100. In the embodiment shown, the insert 200 comprises two halves 210 that are placed on opposing sides of the shaft portion 120 and then joined together. The bore 220 of the insert receives the shaft portion 120 such that the throat 222 is aligned with the narrow region of the shaft, and the enlarged end region 124 is captured within the capture region 224. The insert halves 210 are secured to one another, for example by fasteners extending through fastener holes 230 or by other fastening arrangements as described above, thereby clamping the shaft portion 120 within the bore 220.

Once the nose tip 100 is secured within the insert 200, the subassembly is positioned into the cavity 310 of the adapter 300. The receptacle 314 of the adapter restrains the insert, while the exterior conical surface 122 of the nose tip is aligned with the complementary interior conical surface 312 of the adapter. Fasteners 320 extending through the adapter are then tightened to apply axial preload. This preload urges the insert 200 and nose tip 100 rearward, seating the conical surfaces 122, 312 in firm engagement. The adapter 300 is then attached to the vehicle body 400 at the body interface 330, such as by bolts, clamps, or other fastening structures suitable for the vehicle design.

During operation, aerodynamic and inertial loads acting on the forward aerodynamic portion 110 of the nose tip are transferred through the shaft portion 120 into the assembly. Axial loads are borne primarily by the conical engagement between the exterior surface 122 of the nose tip and the interior surface 312 of the adapter. The enlarged end region 124 of the nose tip is retained within the insert 200, preventing forward pull-out under load. The insert further provides distributed contact with the shaft portion 120, stabilizing the nose tip and assisting in load transfer into the adapter. The anti-rotation feature 240, such as the key 500 received in groove 128 and 240, resists torsional slip between the nose tip and the insert, which may otherwise occur due to vibration, aerodynamic torque, or vehicle maneuvers.

This arrangement avoids the drawbacks of conventional bonded or bolted joints. No holes, threads, or penetrations are required in the composite material of the nose tip, reducing stress concentrations and preserving structural integrity. Adhesives are not required, avoiding the limitations of adhesive bonds under elevated thermal conditions. The conical interfaces provide tolerance accommodation by allowing small dimensional variations or gaps to be taken up under preload, simplifying manufacturing and improving robustness to variability.

Another advantage of the present arrangement is serviceability. Because the insert 200 is separable and the adapter 300 applies preload through mechanical fasteners, a damaged or worn nose tip 100 can be removed and replaced without destroying the surrounding structure. This feature is particularly beneficial for prototype or test vehicles, or for reusable systems where maintenance and replacement may be required between missions.

Through these assembly and operational features, the disclosed nose-tip assembly provides reliable retention of a composite nose tip under the extreme aerodynamic and thermal conditions of hypersonic flight, while also offering advantages in manufacturability, tolerance accommodation, and maintainability.

Method of Assembly

In some embodiments, a method of assembling a nose-tip assembly includes placing an insert 200 comprising multiple insert pieces around a shaft portion 120 of a nose tip 100. The insert pieces may be positioned on opposing sides of the shaft portion so that an internal bore 220 of the insert surrounds the shaft portion. The bore may include a throat 222 narrower than an enlarged end region 124 of the shaft portion, such that when assembled, the enlarged end region is retained within a capture region 224 of the insert.

The method further includes securing the multiple insert pieces together to clamp the shaft portion 120 within the bore 220. In some embodiments, securing the insert pieces may include tightening fasteners extending through fastener holes 230 in the insert pieces. In other embodiments, securing may be accomplished by clamps, bands, pins, interlocking features, or other fastening arrangements. In some embodiments, the insert comprises two pieces that are joined together around the shaft portion, while in other embodiments the insert may include three or more pieces.

The method also includes positioning the nose tip 100 and insert 200 into a cavity 310 of an adapter 300. The cavity may include an interior conical surface 312 configured to engage an exterior conical surface 122 of the shaft portion of the nose tip. Once positioned, the method further includes fastening the adapter 300 to apply a preload urging the exterior conical surface 122 of the nose tip against the interior conical surface 312 of the adapter. In one embodiment, fastening the adapter includes tightening fasteners 320 that extend through the adapter and draw the insert 200 and nose tip 100 rearward toward a bearing surface of the adapter.

In some embodiments, the method may further include engaging an anti-rotation feature between the shaft portion 120 of the nose tip and the insert 200. For example, a key 500 may be received within a groove 128 of the nose tip and a groove 240 of the insert to resist relative rotation. Alternative anti-rotation features, such as splines, keys, tongues, flats, or textured surfaces, may also be used.

In other embodiments, the method may further include applying a preload to the insert 200 prior to fastening the adapter 300, thereby stabilizing the subassembly. The adapter 300 may also be attached to a body 400 of a vehicle using bolts, clamps, or other structural connections.

In some embodiments, the shaft portion 120 of the nose tip may include a curved transition region 126 between the exterior conical surface 122 and the enlarged end region 124, and the method may include positioning the insert 200 to contact at least a portion of the curved transition region. The preload applied by the adapter maintains engagement between the interior and exterior conical surfaces 122, 312 during operation of the vehicle, thereby ensuring stable load transfer and reliable retention of the nose tip under aerodynamic and thermal loads.

Alternative Embodiments and Variations

In alternative embodiments, the nose tip 100 may assume a variety of geometric configurations. The shaft portion 120 may define a generally hourglass profile that is symmetrical or asymmetrical with respect to the throat 222, and in some cases may include curved or stepped transitions to distribute stresses more evenly and reduce the likelihood of stress concentrations. Other shaft contours may also be employed that provide mechanical retention within the insert 200 without requiring a strictly hourglass shape. The forward aerodynamic portion 110 of the nose tip may likewise vary, and may be formed with conical, ogival, parabolic, blunted, or other aerodynamic profiles depending on mission requirements for drag, heating, and manufacturability.

The materials used for the nose tip 100 may also differ from the embodiments shown. In some cases, the nose tip may be formed from carbon-carbon composites, ceramic matrix composites, or other refractory composites capable of withstanding hypersonic flight environments. In other embodiments, ultra-high temperature ceramics, such as zirconium diboride or hafnium carbide, may be employed. Still further, ablative materials or fiber-reinforced refractory composites may be selected to provide either sacrificial protection or enhanced structural reliability. These variations allow the nose tip to be tailored to the performance requirements, cost considerations, and intended service life of the vehicle.

In other embodiments, the insert 200 may be configured in different ways. While the illustrated embodiment employs a two-piece insert joined around the shaft portion of the nose tip, alternative designs may use three or more pieces. Such pieces may be divided along axial, diagonal, or stepped split planes to facilitate assembly, to improve load distribution, or to accommodate nose tip geometries other than the hourglass profile. The means by which the insert pieces are secured together may also vary. In some embodiments, fasteners extend through holes in the insert pieces to clamp them around the nose tip, while in other embodiments the pieces may be held together by clamps, bands, pins, interlocking features, adhesives, brazing, welding, or combinations of these techniques.

The bore defined by the insert may likewise take different forms. In some embodiments, the bore provides continuous load-bearing surfaces that engage the shaft portion of the nose tip along a portion of its length. In other embodiments, the bore may be segmented or may define compound profiles, such as cylindrical, conical, or stepped shapes, tailored to the particular contour of the nose tip. Variations are also possible in the anti-rotation features incorporated into the insert. While one embodiment employs a key received in a groove of the nose tip and the insert, other embodiments may utilize splines, keys, tongues, flats, pins, or textured or frictional surfaces to resist relative rotation. These alternatives may be implemented individually or in combination to provide the desired resistance to torsional slip under aerodynamic or vibratory loads.

The adapter 300 may also take a variety of alternative forms. The receptacle 314 that receives the insert may be cylindrical, conical, stepped, or formed with compound profiles to accommodate different insert geometries. The interior conical surface 312 may likewise vary in angle, length, or contour, and in some cases may include multiple tapered regions to optimize the transfer of axial loads from the nose tip. The body interface 330 used to attach the adapter to the vehicle may also differ depending on vehicle architecture, and may include bolt circles, clamp bands, threaded connections, flanges, or other fastening structures. Preload may be applied in a number of ways, such as by a circumferential array of bolts providing uniform loading around the adapter, or by a smaller number of localized fasteners or clamps. In some embodiments, liners, coatings, or interlayers may be incorporated into the adapter cavity to reduce wear, manage thermal expansion mismatches, or protect against oxidation at elevated temperatures. These variations allow the adapter to be tailored to different vehicle structures, materials, and mission requirements while still providing the beneficial conical engagement with the nose tip.

The geometry of the nose-tip assembly may be scaled for different vehicle sizes and load regimes. By adjusting the proportions of the shaft portion 120 of the nose tip, the bore 220 of the insert, and the cavity 310 of the adapter, the design may be adapted to accommodate higher or lower aerodynamic and structural loads while preserving the beneficial conical engagement and mechanical retention. The hourglass profile of the shaft portion allows dimensional adjustments to be made in relation to expected shear and tension loads, enabling the same basic design to be applied across a range of vehicle classes.

The assembly may also be particularly suitable for prototype or test vehicles, where nose tips may be subject to repeated evaluation and replacement between flights. The mechanical retention achieved by the insert and adapter allows a nose tip to be disassembled and replaced without damaging surrounding structures, providing an advantage for developmental programs and flight demonstrations.

In production or reusable vehicles, the assembly may likewise provide benefits in serviceability, tolerance accommodation, and manufacturing repeatability. The ability to maintain reliable retention without adhesives or penetrations into brittle composite materials simplifies manufacturing and improves reliability for long-term use.

In some embodiments, the assembly may also be configured for integration with thermal protection systems. For example, the adapter 300 may be designed to interface with surrounding TPS tiles, ablative coatings, or reusable insulation applied to the vehicle body 400. This compatibility enables the nose-tip assembly to be incorporated into a broader thermal management system while maintaining the structural advantages of the disclosed design.

Advantages

The disclosed nose-tip assembly offers several advantages compared to conventional bonded or bolted attachment designs. In some embodiments, the assembly avoids the use of adhesives, which are difficult to analyze, complicated to apply, and prone to degradation at elevated temperatures. Eliminating adhesive bonds reduces uncertainty in performance and extends the usable temperature range of the assembly.

The design also avoids the need for holes, threads, or other penetrations in the composite material of the nose tip. Such penetrations can create stress concentrations, reduce load-bearing area, and increase the likelihood of crack initiation in brittle composites. By relying on geometric retention through the enlarged end region of the shaft portion and load transfer through the conical engagement, the assembly preserves the integrity of the composite structure.

The conical engagement between the nose tip and the adapter allows axial loads to be transferred efficiently while accommodating dimensional tolerances. Manufacturing variations or gaps may be taken up under preload, reducing the need for tight tolerances and simplifying fabrication. The curved transition and hourglass-like contours of the shaft portion further distribute stresses, helping to avoid localized concentrations that might otherwise limit structural life.

Another advantage is serviceability. Because the assembly is mechanically retained and does not rely on adhesives or permanent bonds, a nose tip may be removed and replaced without destroying surrounding structures. This feature is useful for developmental test programs where repeated replacement may be required, and for reusable systems where maintenance between missions may be necessary.

The configuration is also scalable across different vehicle classes and load regimes. By adjusting the geometry of the shaft portion, insert, and adapter, the same assembly concept can be applied to small prototype vehicles, full-scale hypersonic flight systems, rockets, or spacecraft. The design further allows for integration with thermal protection systems, enabling the nose-tip assembly to operate as part of a broader thermal management solution.

Collectively, these features provide a retention system that is reliable under extreme thermal and aerodynamic conditions, flexible in design and application, and advantageous for both prototype and production aerospace vehicles.

Although specific embodiments of the nose-tip assembly have been described and illustrated herein, it will be understood that various modifications and adaptations may be made without departing from the scope of the invention. Features of different embodiments may be combined in whole or in part, and materials, geometries, and fastening techniques may be substituted according to particular design requirements or manufacturing preferences.

The terminology used in this disclosure is intended to describe particular embodiments only and is not limiting. As used herein, the singular forms “a,” “an,” and “the” include plural referents unless the context clearly indicates otherwise. Terms such as “comprising,” “including,” or “having” are intended to be open-ended and mean that additional elements, features, or steps may be present.

It should therefore be understood that the invention is not limited to the precise details shown and described, but rather encompasses all variations, modifications, and equivalents that fall within the scope of the appended claims.

What is claimed is:

1. A nose-tip assembly for a vehicle, comprising:

a nose tip having a forward aerodynamic portion and a rearward shaft portion, the rearward shaft portion including an exterior conical surface and an enlarged end region;

an insert comprising multiple pieces securable together to define an internal bore receiving the rearward shaft portion of the nose tip, the internal bore including a throat sized smaller than the enlarged end region such that the enlarged end region is retained within the insert; and an adapter defining a cavity having an interior conical surface engaging the exterior conical surface of the nose tip, and a receptacle receiving the insert.

2. The nose-tip assembly of claim 1 wherein the rearward shaft portion includes a curved transition region between the exterior conical surface and the enlarged end region.

3. The nose-tip assembly of claim 1 wherein the insert and the adapter are fastened together to apply a preload urging the exterior conical surface of the nose tip against the interior conical surface of the adapter.

4. The nose-tip assembly of claim 1 wherein the insert comprises two pieces securable together around the rearward shaft portion.

5. The nose-tip assembly of claim 1 wherein the insert includes an anti-rotation feature configured to resist rotation of the nose tip relative to the insert.

6. The nose-tip assembly of claim 1 wherein the insert defines continuous load-bearing surfaces engaging the rearward shaft portion of the nose tip along at least a portion of its length.

7. The nose-tip assembly of claim 1 wherein the adapter is configured to be fastened to a vehicle body.

8. The nose-tip assembly of claim 1 wherein the adapter and the insert are configured such that preload of the adapter maintains contact between the exterior and interior conical surfaces during operation.

9. A vehicle comprising the nose-tip assembly of claim 1.

10. The vehicle of claim 9 wherein the vehicle is a hypersonic vehicle, a rocket, or a spacecraft.

11. A method of assembling a nose-tip assembly, comprising:

placing an insert comprising multiple insert pieces around a shaft portion of a nose tip;

securing the multiple insert pieces together to clamp the shaft portion within a bore of the insert;

positioning the nose tip and insert into a cavity of an adapter; and fastening the adapter to apply a preload urging an exterior conical surface of the nose tip against an interior conical surface of the adapter.

12. The method of claim 11 wherein securing the multiple insert pieces together comprises tightening fasteners extending through the insert.

13. The method of claim 11 further comprising engaging an anti-rotation feature between the shaft portion of the nose tip and the insert.

14. The method of claim 11 wherein the insert comprises two pieces that are joined together around the shaft portion.

15. The method of claim 11 further comprising applying a preload to the insert prior to fastening the adapter.

16. The method of claim 11 wherein fastening the adapter comprises tightening fasteners that draw the nose tip toward a bearing surface of the adapter.

17. The method of claim 11 wherein the step of placing the insert around the shaft portion includes aligning the shaft portion within a throat of the insert narrower than an enlarged end region of the shaft portion.

18. The method of claim 11 wherein the preload maintains engagement between the interior and exterior conical surfaces during operation of a vehicle.

19. The method of claim 11 further comprising attaching the adapter to a body of a vehicle.

20. The method of claim 11 wherein the shaft portion of the nose tip includes a curved transition region between the exterior conical surface and an enlarged end region, and the method includes positioning the insert to contact the curved transition region.

* * * * *